M. ROCKSTROH.
BELT CONTROLLING MEANS.
APPLICATION FILED JAN. 15, 1915.

1,169,511. Patented Jan. 25, 1916.

UNITED STATES PATENT OFFICE.

MAX ROCKSTROH, OF KLEIN SEDLITZ, NEAR PIRNA, GERMANY.

BELT-CONTROLLING MEANS.

1,169,511.  Specification of Letters Patent.  Patented Jan. 25, 1916.

Application filed January 15, 1915. Serial No. 2,460.

*To all whom it may concern:*

Be it known that I, MAX ROCKSTROH, manufacturer, subject of the King of Saxony, Germany, residing at Klein Sedlitz, near Pirna, Germany, have invented certain new and useful Improvements in Belt-Controlling Means, of which the following is a specification.

My invention relates to "improvements in controlling devices, especially applicable for use with electrically operated printing and stamping machines" and is a modification of the invention set forth in the specification of my Patent No. 993,317. In that specification I have shown a belt tensioning roller on a lever which is held in its operative position by a spring, and is disengaged by a cam on a brake lever, the cam being arranged to release, at the same time, a weighted belt-gripping lever, which holds the slackened belt upon the said roller. With this arrangement considerable force must be applied for compressing the spring, and the spring is expanded to the fullest extent which it attains, when the tensioning roller is operative, that is to say when the spring pressure is actually required.

According to my present invention I use a belt-tensioning lever and a belt-gripping lever connected to each other by a spring, which tends to hold the gripping lever against the tensioning lever, and is stressed by the operation of removing the former from the latter, the tensioning lever being by this means moved into operative position.

Figure 1:
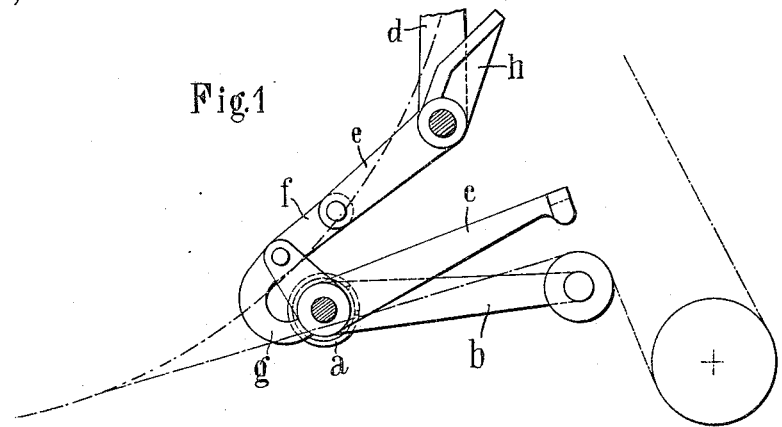
Figure 2:
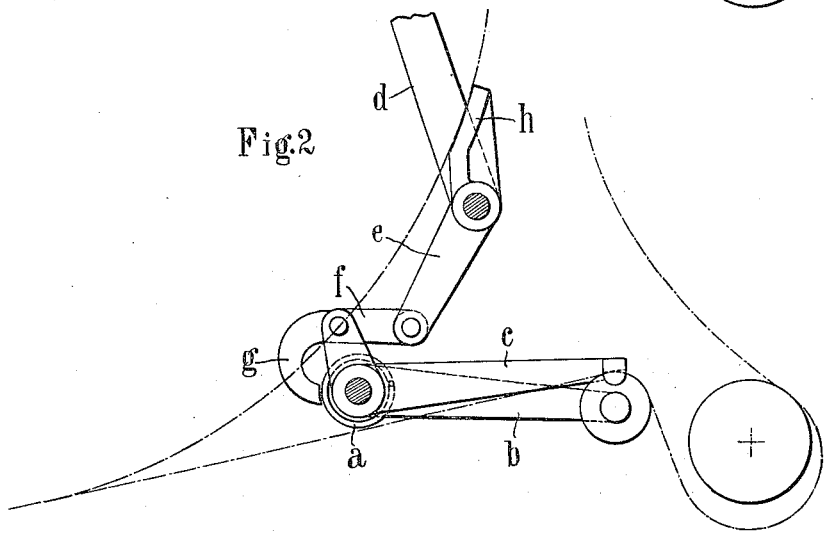
Figure 3:
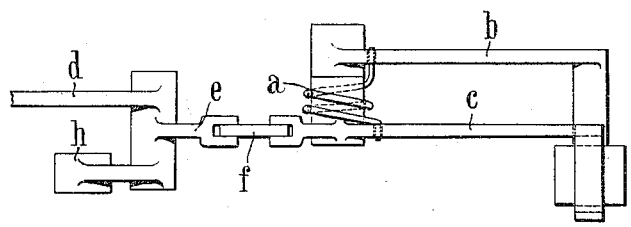

The invention is illustrated in the accompanying drawings, which show one form of construction, Figure 1 being a side view, showing the tensioning roller in operation, and Fig. 2 a side view, showing the tensioning roller out of operation and the brake applied. Fig. 3 is a plan view.

In the drawings $a$ designates a coiled spring, the ends of which are engaged with the tensioning lever $b$ and the belt-gripping lever $c$ respectively. The brake lever $d$ has an arm $e$ connected by a link $f$ to an arm of the lever $c$. The link $f$ has a curved extension or tail $g$, arranged to abut, in the position shown in Fig. 1, against the boss at the fulcrum of the lever $c$, thereby limiting the movement of the levers $d$ and $c$ in one direction, the movement in the other direction being limited by the brake member $h$. The spring $a$ tends to hold the levers $b$ and $c$ in such position, in relation to each other, that a projection of the lever $c$ bears against the tensioning roller, or clamps the belt on this roller.

The action is as follows: In the working position, with the belt tensioned (Fig. 1), the lever $c$ is raised. The raising of this lever serves to lift the lever $b$, by means of the spring $a$ connecting the two levers. The upward movement of the lever $c$ continues after the belt is taut, so that the flexing or stressing of the spring is increased after the lever $b$ has reached its operative position. When the lever $d$ is moved toward the position shown in Fig. 2, the lever $c$ first moves down toward the lever $b$, until its projection grips the belt on the tensioning roller, the spring $a$ being partly relaxed, and then both levers move down together until the brake member $h$ is applied to the fly-wheel, the belt being relaxed.

The device has several considerable advantages. The stressing of the spring, for making the belt tight, occurs after the tensioning roller has drawn the belt against the driving pulley. There is no spring pressure to overcome, in disengaging the belt. The use of a weighted lever is obviated, the spring serving to grip the belt on the tensioning roller, when the belt is relaxed. A slight push exerted on the lever $d$, when it is in the position shown in Fig. 1, merely sufficient to disengage it from the catch or the like by which it is held, is sufficient to cause relaxation of the belt, and stoppage of the drive, so that the said lever may conveniently be associated with a guard for the operator's hands so that if the operator places his hand in a dangerous position, and touches this guard, the press is stopped.

Having now particularly described and ascertained the nature of my said invention and in what manner the same is to be performed, I declare that what I claim is:

1. A belt controlling means comprising in combination, a pulley, a belt gripping and a tensioning lever, a coiled spring engaging with its ends both of said levers, a brake lever, means for connecting said brake lever and said gripping lever, means for limiting the movements of said belt gripping and tensioning levers in one direction, said pulley being adapted to limit their movements in the other direction, substantially as described.

2. A belt controlling means comprising in combination, a pulley, a belt gripping lever having an arm and a tensioning lever, a coiled spring engaging said levers with its ends, a brake lever having an arm, a link connecting said brake lever to the arm of said gripping lever, a tail piece on said link for limiting the movements of said belt gripping and tensioning levers in one direction, said pulley limiting this movement in the other direction, substantially as described.

In testimony whereof I have hereunto set my hand in presence of two subscribing witnesses.

MAX ROCKSTROH.

Witnesses:
CLARE SIMON,
BERTOLD A. BRAUN.

Copies of this patent may be obtained for five cents each, by addressing the "Commissioner of Patents, Washington, D. C."